Oct. 9, 1973            P. F. GEORGE            3,764,459
SELF-DESTRUCTING METAL STRUCTURES
Original Filed Jan. 21, 1970
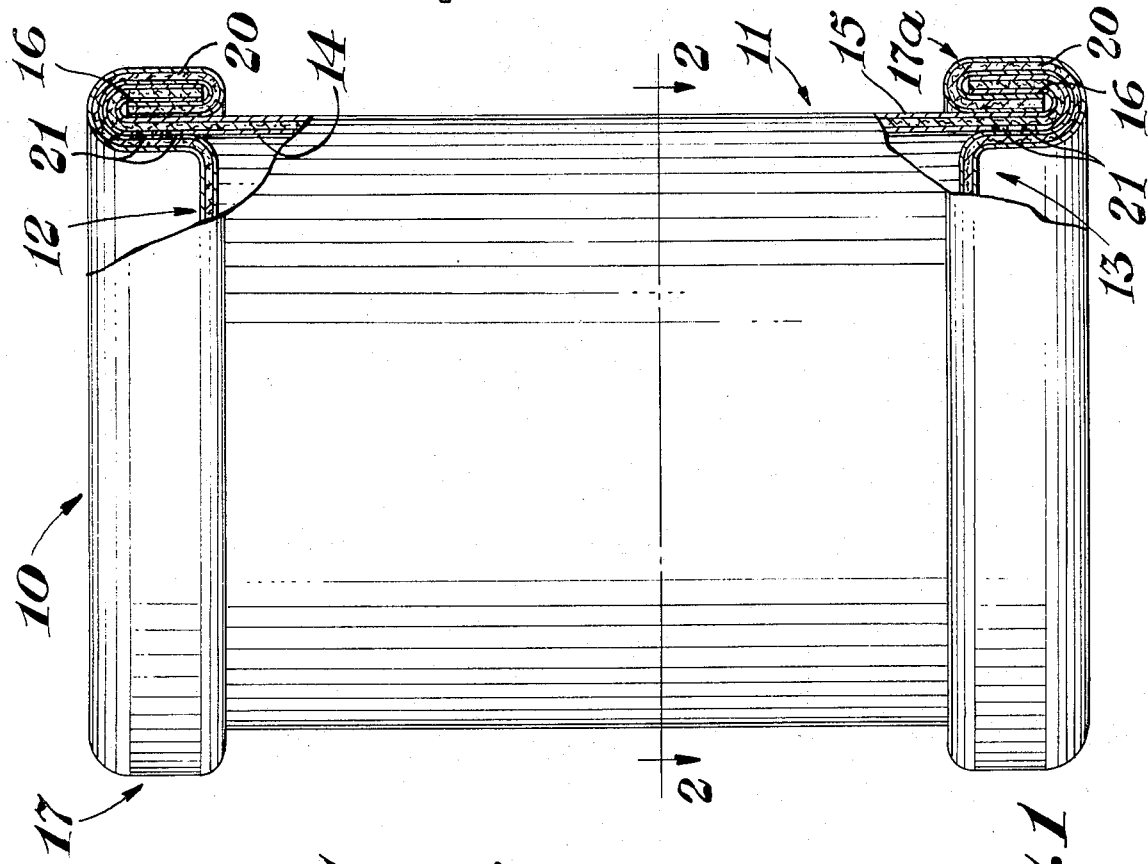
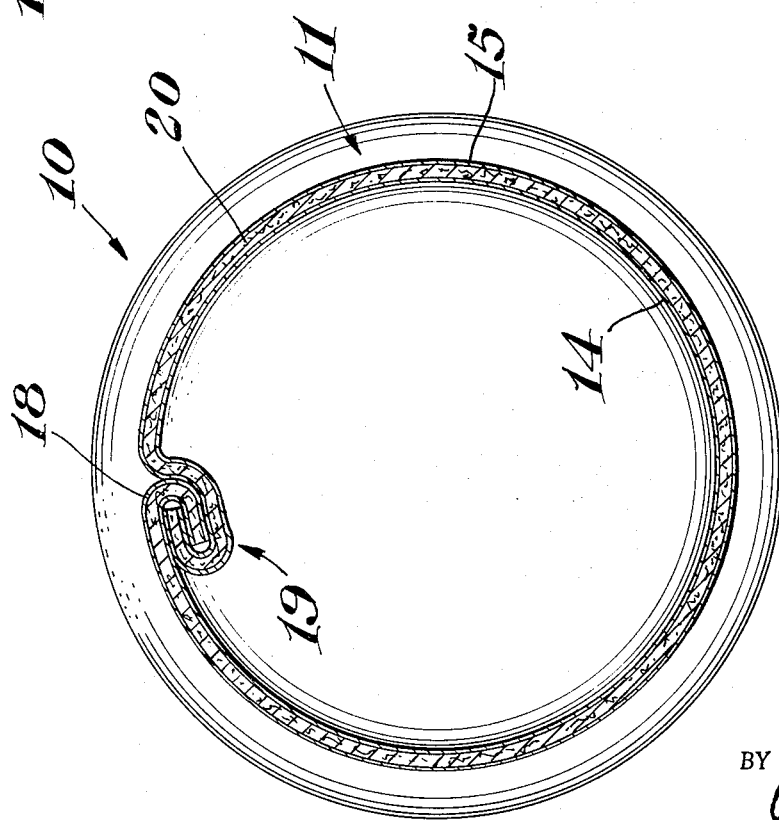
INVENTOR.
Percy F. George
BY
AGENT

United States Patent Office

3,764,459
Patented Oct. 9, 1973

3,764,459
SELF-DESTRUCTING METAL STRUCTURES
Percy F. George, Midland, Mich., assignor to The Dow Chemical Company, Midland, Mich.
Original application Jan. 21, 1970, Ser. No. 4,613. Divided and this application May 20, 1971, Ser. No. 145,299
Int. Cl. B32b 15/04
U.S. Cl. 161—225
6 Claims

ABSTRACT OF THE DISCLOSURE

A metal laminate is provided which will deteriorate after the interior of the laminate is contacted by moisture. Self-destructing containers are fabricated of this structural laminate. The laminate includes at least two layers of dissimilar metals which are electronically connected. One of the metal layers is an aluminum-based metal and the other layer is a metal anodic to the aluminum-based metal, such as a magnesium-based metal. Positioned between the metal layers is at least one layer of an electrolyte-forming composition capable of establishing ionic communication between the metal layers when the composition is contacted with moisture. A preferred electrolyte-forming composition is an inorganic salt containing an alkali metal or an alkaline earth metal, such as sodium chloride. When the electrolyte-forming composition is contacted by sufficient moisture to provide ionic conduction between the metal layers, a galvanic cell is formed having the unique property of simultaneously deteriorating at both the anode and cathode.

CROSS REFERENCE TO RELATED APPLICATION

This is a division of application Ser. No. 4,613, filed Jan. 21, 1970, now U.S. Pat. No. 3,629,091.

BACKGROUND OF THE INVENTION

The invention relates broadly to self-destructing metal structures comprising two or more electronically connected layers of dissimilar metals and one or more layers of an electrolyte-forming composition positioned between each pair of metal layers. The invention further concerns a metal container fabricated of such a structural laminate.

Most non-returnable metal containers in use today require a relatively long period of time to deteriorate when the container is discarded. With millions of such containers being discarded each day, the problem of sufficient space to dispose of the refuse is one of growing concern. It would be desirable, therefore, to provide a metal container which after being opened would deteriorate within a few months in an outdoor environment.

OBJECTS

Accordingly, a principal object of the invention is to provide a metal laminate suitable for the fabrication of containers, which after being opened will deteriorate substantially more rapidly than the prior metal containers.

A more specific object is to provide a metal container fabricated from a laminate including dissimilar metal layers and an electrolyte-forming composition, to provide a container which will undergo deterioration aided by galvanic corrosion upon containing the electrolyte-forming composition with moisture.

Still another object is to provide a structural laminate in which each of the metal components of the laminate deteriorates simultaneously.

SUMMARY OF THE INVENTION

Broadly, the invention provides a structural metal laminate useful for the fabrication of metal containers, which laminates undergo simultaneous deterioration in each of its metal components, once its interior is contacted by moisture. In one further embodiment of the invention, a container is provided, with at least one wall member of the container comprising the delineated structural laminate. This laminate includes at least two layers of dissimilar metals, with the metal layers being electronically connected, i.e. connected so as to permit electron flow from one to the other. One of the metal layers is an aluminum-based metal and the other layer is a metal anodic to the aluminum-based metal. At least one layer of an electrolyte-forming composition containing an alkali metal or an alkaline earth metal salt is positioned between the metal layers of the laminate, the composition being capable, when connected with moisture, of providing ionic communication between the metal layers.

FIG. 1 is a front elevation view, partly in section, of a container made from the described laminate.

FIG. 2 is a view of the container of FIG. 1 taken on the line 2—2.

DESCRIPTION OF A PREFERRED EMBODIMENT

Referring to the drawings the numeral 10 indicates generally a cylindrical metal container. Basically, container 10 comprises a side wall 11, a top wall 12 and a bottom wall 13. According to the embodiment of the invention illustrated, the container walls comprise a three-layer structural laminate. The laminate includes at least two metal layers 14, 15, with one layer being an aluminum-based metal and the other layer being a metal anodic to the aluminum-based metal layer. Electron flow between the metal layers 14, 15 is provided for by electronically connecting the layers by face-to-face contact 16 of the two metals within the top and bottom chime portions 17, 17a of container 10. A similar electronic connection between the metal layers of the laminate which comprise the side wall 11 is formed by joint 18 of side seam 19 (note FIG. 2). At least one layer of an electrolyte-forming composition 20 is positioned between the metal layers 14 and 15.

The metal layers 14, 15 of the laminate structure may be either single metals, metal alloys or clad metals so long as one layer is essentially an aluminum-based metal and the other metal layer is anodic to the aluminum-based metal layer. For the aluminum-based metal layer, it is preferred to use an aluminum alloy containing at least 50% aluminum, and more preferably at least about 85% aluminum. Typical aluminum alloys which may be used are those compositions listed in the Registration Record of Aluminum Association Alloy Designations and Chemical Composition Limits for Wrought Aluminum Alloys. Representative of the alloy compositions which may be used are those designated by the following Aluminum Association numbers: 1100, 2017, 3002, 4045, 5052, 5056, 6061, 7075 and 8001.

Selection of an appropriate metal or metal alloy which will be anodic to the aluminum-based metal may be determined from a standard reference table of the Electromotive Series of Metals and Alloys (see Lange's Handbook of Chemistry, 10th ed., edited by N. A. Lange, McGraw-Hill Book Co., 1967, pp. 1223–1230). In the practice of the invention the preferred anodic metal layer is a magnesium-based alloy, which contains at least 50% magnesium and preferably at least about 85% magnesium. Typical magnesium alloy compositions which may be used include those listed by Amer. Soc. for Testing Materials under the following ASTM designations: MIA, AZ31B, A3A, AZ61A, AZ61B, AZ80A, ZK60A and ZE10A (see Metals Handbook, Amer. Soc. for Metals). Representative of other metals or alloys which may be used as the anodic metal layer are zinc-based metals and galvanized steel.

The choice of which metals or alloys are employed for each of the layers in the container laminate will depend on various factors, such as strength requirements of the container laminate, cost and feasibility of using certain metals in a container-fabrication and the like. Although the thickness of the individual metal layers utilized is not critical, they will usually be metal foils less than about ⅛ inch thick. Another consideration is positioning of the metal layers within a fabricated container. For example, if it is desired to have the inner layer (14) function as a cathode and the outer layer (15) function as an anode, the inner layer will be an aluminum-based metal and the outer layer will be a metal anodic to the aluminum-based layer, such as a magnesium-based alloy. If it is desired instead that the inner layer be anodic and the outer layer be cathodic, the positions of the aluminum-based and magnesium-based metal layers in the laminate are reversed. Preferably, the container laminate, which includes the metal layers 14, 15 and the electrolyte-forming composition 20, is a generally flexible structure having an over-all or total thickness of not more than about 0.250 in.

For the electrolyte-forming composition 20, the preferred materials are those dry salts or mixtures of salts which are capable of ionizing in a water solution to thereby provide ionic communication between the metal layers 14, 15, but which in a dry condition are essentially non-conductors. Broadly, the invention includes the anhydrous alkali metal and alkaline earth metal salts. The alkali metal salts are preferred. Especially preferred are the alkali metal salts of strong acids, such as sodium chloride, potassium chloride, lithium chloride and sodium sulfate. The preferred alkaline earth metal salts are the salts of magnesium and barium, particularly barium chloride and magnesium chloride. In the practice of the invention, one or more hygroscopic materials may be added to the electrolyte-forming salt to enhance its water-absorbing capacity. Particularly preferred electrolyte-forming compositions are mixtures of alkali metal salts with hygroscopic or deliquescent salts, such as calcium chloride or magnesium chloride.

Positioning or layering of the electrolyte-forming salt between the metal layers of the laminate structure may take several forms. For example, the salt composition may be adhered to the inner surfaces of the metal layers, it may be placed between the metal layers as a loose composition or it may be impregnated onto a bibulous carrier material and the carrier strip sandwiched between the metal layers of the laminate. Use of a salt-impregnated carrier strip as the electrolyte-forming composition is preferred, since the bibulous carrier material can act as a wick to help carry moisture between the metal layers of the laminate after the container is opened. Suitable carrier materials for the electrolyte-forming composition include absorbent papers, such as paper toweling; porous hydrophilic adhesives, porous polymeric films, such as open-cell plastic films, and soluble polymeric films of water-soluble cellulosic film formers, such as methylcellulose, hydroxyethyl cellulose and carboxymethylcellulose. It will be readily understood that the electrolyte-forming composition is sealed between the metal layers of the laminate to insure that the composition does not come into premature contact with moisture.

When it is desired to initiate deterioration of the laminate, as in the walls of a discarded container, the laminate structure is severed, as with a tear strip (not shown) integrally formed in the top wall 12 of the container. Although a tear strip is preferred, any device which will effectively sever or puncture the container laminate, such as a can opener, may be used to achieve communication between the electrolyte-forming composition and environmental moisture. When the container laminate is severed and the electrolyte-forming salt is wetted with moisture, which may be in the form of rain, snow, dew, condensate, atmospheric moisture, or the like, an electrolyte solution is formed, providing ionic communication between the metal layers. In the practice of the invention, the formation of the electrolyte solution initiates a simultaneous deterioration of the anodic and cathodic metal layers of the container laminate. Although not fully understood, this deterioration is at least in part a result of galvanic action.

In the illustrated container, once the laminate structure of the top wall 12 is severed, wetting of the salt layer 20 in a sidewall 11 of the container is enhanced by migration of the moisture through one or more perforations 21, which extend through the double metal layer joint formed in chime portions 17 and 17a. In fabricating the chime portion 17 it will be apparent that the perforations 21 must be placed far enough up in the double layer joint to be sealed off from the contents of the container. Construction of the chime portion in this manner will prevent any moisture in the container contents from contacting the electrolyte-forming salt before the container is opened and thereby avoid premature initiation of the corrosive reaction.

Further embodiments of the invention include laminates and containers fabricated thereof, comprising a multi-layer, structural laminate with more than two metal layers and one or more electrolyte-forming compositions positioned between each pair of metal layers. A specific example of this embodiment is a structural laminate comprising two layers of an aluminum-based metal and one layer of magnesium-based metal, which is positioned between the aluminum layers. The laminate also includes an electrolyte-forming composition, defined by a bibulous carrier strip impregnated with sodium chloride, which is positioned between each of the pairs of metal layers.

The following examples are given to illustrate the invention, but are not to be construed as limiting the invention to the embodiment described herein.

Example I

A sheet of paper towel measuring approximately 4 sq. in. was soaked in a saturated aqueous solution of sodium chloride and the salt impregnated paper sheet was dried at room temperature. A sheet of magnesium alloy (AZ61B) measuring about 4 in. square and 0.003 in. thick was adhered to one side of the paper sheet by applying spots of adhesive at various places between the metal and the paper. To the opposite side of the paper sheet was adhered a sheet of aluminum foil about 4 in. square and 0.002 in. thick, to complete the three-layer laminate. The laminate was cut into two separate sections. The top edge of each section was folded over to form an electronic connection, i.e. metal-to-metal contact, between the dissimilar metals.

One section was stood upright on its bottom edge in a shallow pool of water and held in this position for about 48 hours to wet the paper layer exposed along the bottom edge of the section. The other section was allowed to lay on a bench at room temperature for the same 48-hour period. When the 48-hour period had elapsed the section standing in water was removed from the water and checked for corrosion. At the same time the laminate section not contacted with water was checked for corrosion. For the section contacted with water it was noted that both the magnesium layer and the aluminum layer had substantially deteriorated. With regard to the section not contacted with water, no visible evidence of corrosion could be detected thereon.

Example II

A sheet of paper towel about 7 in. wide and 5 in. long was soaked in a saturated aqueous solution of sodium chloride. After being thoroughly soaked the paper sheet was removed from the solution and the salt allowed to dry on the paper at room temperature. To one side of the paper sheet was adhered a sheet of magnesium-based alloy (AZ61A), which measured about 7 in. wide, 5 in. long and 0.003 in. thick. A sheet of aluminum foil about 7 in. wide, 5 in. long and 0.002 in. thick was adhered to the opposite side of the paper sheet, to complete the three-layer laminate. The laminate was divided into two separate sections measuring about 3.5 in. wide and 5 in. long. Each of the flat laminate sections was formed into a cylindrical section having a side seam joint similar to the cylindrical laminate illustrated in FIG. 2, to provide electronic contact between the metal layers.

Following the procedure of Example I, one of the cylindrical sections was stood upright in a pool of shallow water and held in this position for about 24 hours to wet the exposed paper layer along the bottom of the laminate structure. For the same 24 hour period, the other cylindrical laminate was allowed to lay on a bench at room temperature. After 24 hours the section standing in water was removed and checked for deterioration. It was observed that about half of the magnesium layer and about the same amount of the aluminum layer had been consumed by corrosion. No corrosion was visible on the cylindrical section which had lain on the bench.

Example III

Two (2) sheets of paper towel about 4 in. square were soaked in a saturated aqueous solution of sodium chloride and the papers were allowed to dry at room temperature. The paper sheets were adhered to opposite sides of a sheet of magnesium-based alloy (AZ61) about 4 in. square and 0.003 in. thick. A sheet of aluminum foil measuring about 4 sq. in. by 0.002 in. thick was then adhered to the exposed surface of each paper sheet (the surface not adhered to the magnesium layer), to complete the five-layer laminate. The top edge of the metal layers, which extended slightly beyond the edge of the paper layers, were folded over and crimped together to provide electronic contact between the metal layers. The laminate was then cut into two sections of about equal size, the cut being made through the folded edge so that each section had one edge in which the metal layers were electronically connected.

Following the procedure of Example I, one of the laminate sections was stood upright in a pool of shallow water and held in this position for about 48 hours. For the same 48 hour period the other laminate section was allowed to lay on a bench at room temperature. After 48 hours the section which had been standing in water was removed and checked for corrosion. It was observed that about half of each of the metal layers had been consumed from corrosion. With regard to the laminate section not contacted with water, no visible evidence of corrosion could be observed.

What is claimed is:

1. A self-destructing metal structural laminate which comprises:
   (a) at least one layer of an aluminum-based metal;
   (b) at least one layer of a metal anodic to the aluminum-based metal layer; the said metal layers being electronically connected; and
   (c) at least one layer of an electrolyte-forming salt composition which is selected from the group consisting of alkali metal chlorides, alkali metal sulfates, and alkaline earth metal chlorides; which is impregnated into a bibulous carrier strip and positioned between the metal layers; and which is capable of ionizing when contacted with moisture to provide ionic communication between the metal layers.

2. The laminate structure of claim 1 in which the anodic metal layer is selected from the group consisting of a magnesium-based metal, a zinc-based metal, and a galvanized steel metal.

3. The laminate structure of claim 1 in which the electrolyte-forming composition is sealed from the atmosphere.

4. The laminate structure of claim 1 in which the electrolyte-forming salt composition contains a hygroscopic additive selected from the group consisting of calcium chloride and magnesium chloride.

5. The laminate structure of claim 1 in which the structure is flexible and the over-all thickness of the laminate is not more than 0.250 inch.

6. The laminate structure of claim 1 in which the metal layer which is anodic to the aluminum-based metal layer is a magnesium-based alloy and the electrolyte-forming salt composition is sodium chloride.

References Cited

UNITED STATES PATENTS

| 3,629,092 | 12/1971 | George | 204—197 |
| 2,318,184 | 5/1943 | Rojas | 161—225 X |
| 1,811,160 | 6/1931 | Stevenson | 204—197 X |
| 2,490,978 | 12/1949 | Osterheld | 204—197 X |
| 3,152,717 | 10/1964 | Schwaiger | 220—64 |
| 3,308,046 | 3/1967 | Suleski | 204—196 |
| 3,376,166 | 4/1968 | Hruden | 136—107 X |
| 3,388,824 | 6/1968 | Hazard | 161—213 X |
| 3,415,402 | 12/1968 | Webber | 220—64 X |
| 3,451,913 | 6/1969 | Laborde et al. | 204—148 X |
| 3,475,143 | 10/1969 | O'Connor et al. | 161—213 X |

GEORGE F. LESMES, Primary Examiner

W. R. DIXON, JR., Assistant Examiner

U.S. Cl. X.R.

161—213, 220, 410; 220—83, DIG. 30

UNITED STATES PATENT OFFICE
CERTIFICATE OF CORRECTION

Patent No. 3,764,459          Dated October 9, 1973

Inventor(s) Percy F. George

It is certified that error appears in the above-identified patent and that said Letters Patent are hereby corrected as shown below:

On the cover sheet insert -- The portion of the term of this patent subsequent to Dec. 21, 1988, has been disclaimed. --.

Signed and sealed this 31st day of December 1974.

(SEAL)
Attest:

McCOY M. GIBSON JR.
Attesting Officer

C. MARSHALL DANN
Commissioner of Patents